Figure 1:
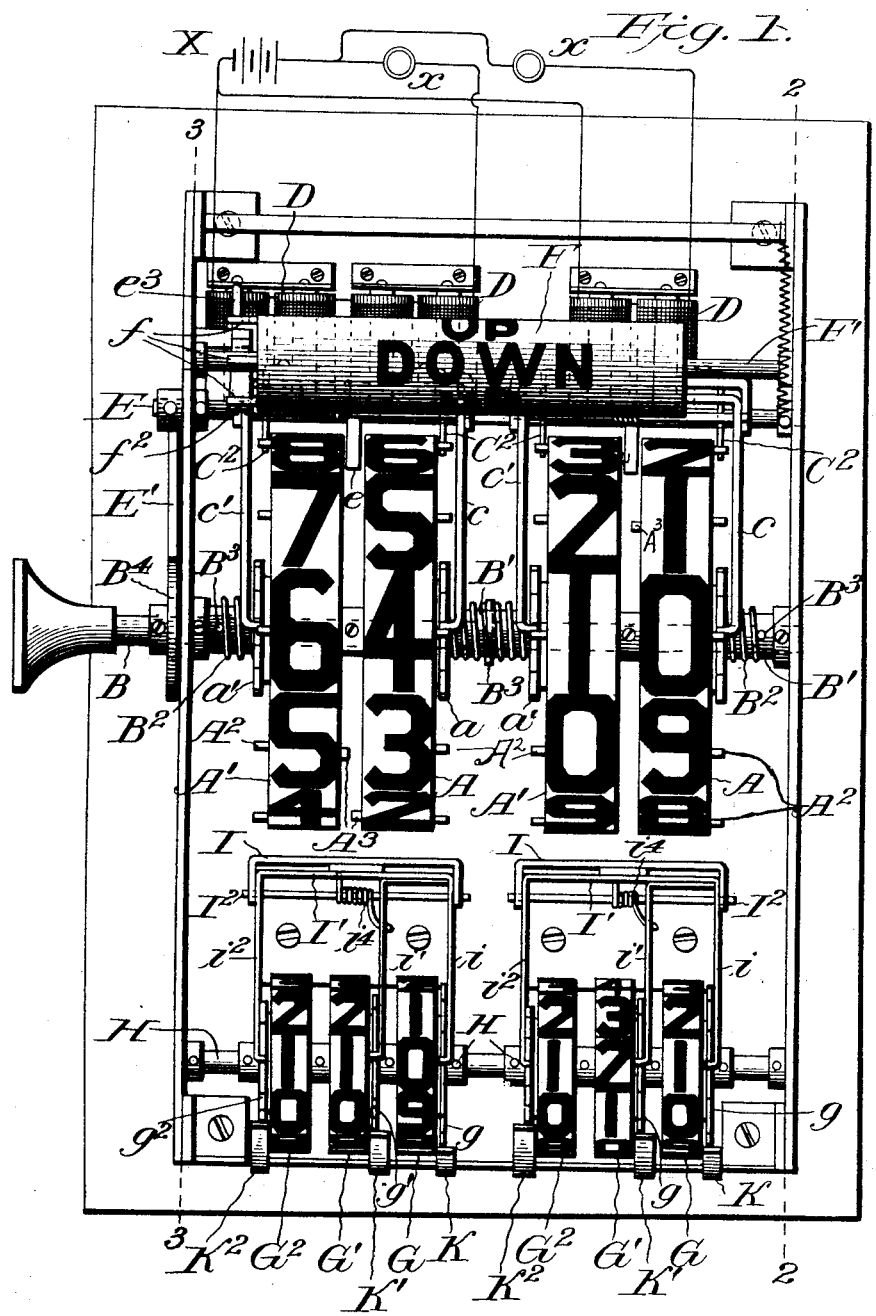

No. 767,000. PATENTED AUG. 9, 1904.
J. H. JOHNSON.
FARE INDICATOR AND REGISTER.
APPLICATION FILED JAN. 21, 1904.
NO MODEL. 3 SHEETS—SHEET 1.

WITNESSES:
INVENTOR
James H. Johnson
By Alexander & Sowell
Attorneys.

No. 767,000. PATENTED AUG. 9, 1904.
J. H. JOHNSON.
FARE INDICATOR AND REGISTER.
APPLICATION FILED JAN. 21, 1904.
NO MODEL. 3 SHEETS—SHEET 2.

WITNESSES: INVENTOR
James H. Johnson
BY
Alexander & Dowell
Attorneys.

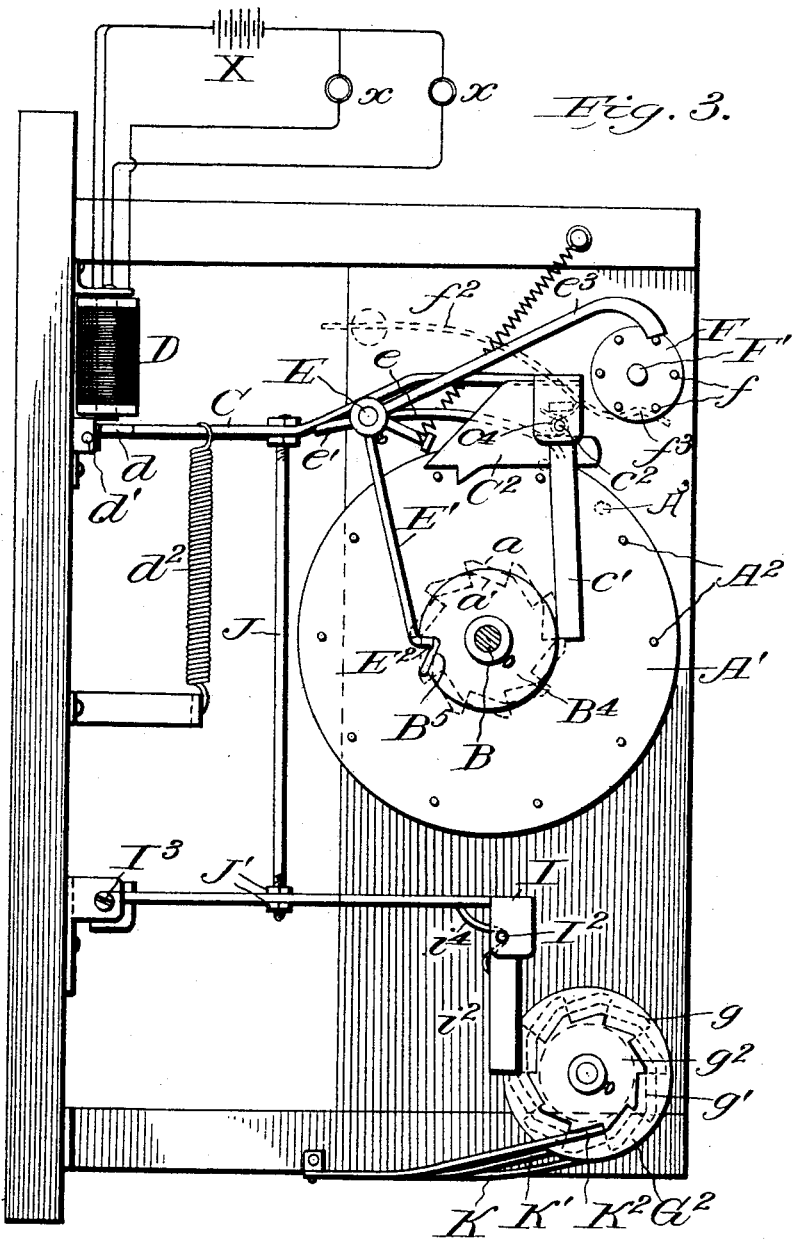

No. 767,000. Patented August 9, 1904.

UNITED STATES PATENT OFFICE.

JAMES H. JOHNSON, OF DALE, INDIANA.

FARE INDICATOR AND REGISTER.

SPECIFICATION forming part of Letters Patent No. 767,000, dated August 9, 1904.

Application filed January 21, 1904. Serial No. 190,070. (No model.)

*To all whom it may concern:*

Be it known that I, JAMES H. JOHNSON, of Dale, in the county of Spencer and State of Indiana, have invented certain new and useful Improvements in Fare Indicators and Registers; and I hereby declare that the following is a full, clear, and exact description thereof, reference being had to the accompanying drawings, which form a part of this specification.

This invention is an improvement in indicating and registering mechanism particularly designed for street-railway fare registers and indicators, being adapted to indicate the kind and number of fares for each trip and to register the total number of each kind of fares received and when applied to street-railway fare-registers mechanism is also provided for indicating the outgoing and incoming trips of the car.

The invention is designed to be operated electrically from push-buttons located at convenient points in the car, thus dispensing with the use of pull-cords or shafting, although the indicator mechanism can be operated by hand or any suitable devices, such as are commonly employed.

The invention consists in the constructions and combinations of parts summarized in the several claims appended to the following description of the mechanism illustrated in the drawings, in which—

Figure 2:
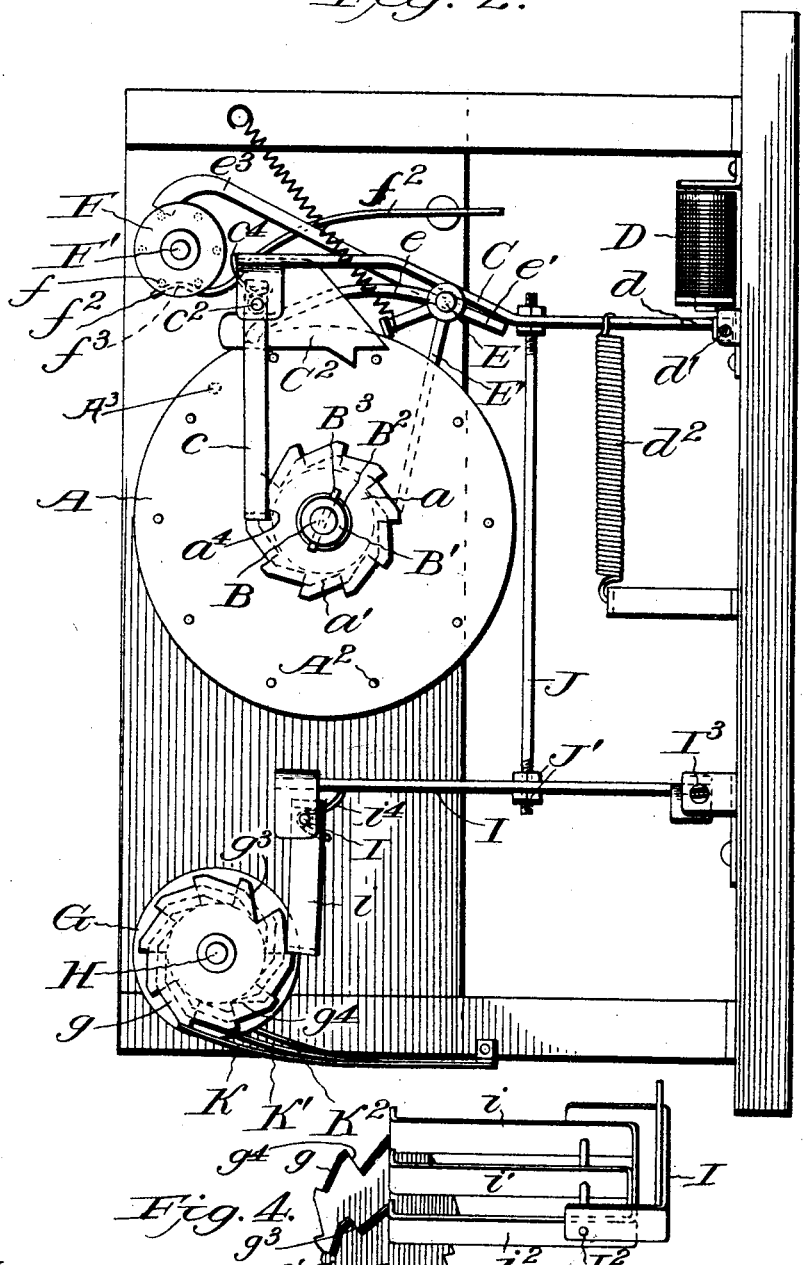
Figure 4:
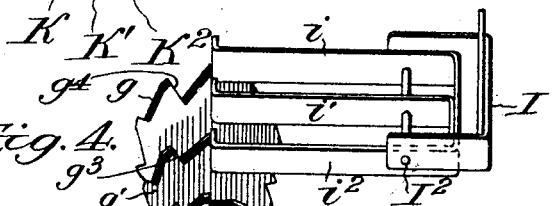

Figure 1 is a front view of the complete mechanism, with the casing removed. Fig. 2 is a sectional elevation on line 2 2, Fig. 1. Fig. 3 is a sectional elevation. Fig. 4 is a detail perspective view of the registering mechanism.

Two adjacent related indicating disks or wheels A A' are rotatably mounted on a supporting-shaft B, which is rotatably journaled in the sides of a suitable framework or casing containing the indicating mechanism. These disks are provided on their peripheries with the numerals "0" to "9," inclusive, which will be properly displayed at a sight-opening in the casing, as usual. Each disk is provided with a ratchet-wheel $a$ $a'$, having ten teeth. As shown, the disks are positioned on the shaft by and between collars B', attached to the shaft, but leaving the disks free to rotate thereon. The outermost collars B' are long, and helical springs $B^2$ are slipped on these collars and press against the disks and the pins $B^3$, which hold the collars in place, thereby making a loose frictional connection between the disks and shaft, which will not prevent the disks being rotated thereon, but will enable the disks to be reset to "00" position when desired by rotating shaft B, as hereinafter explained.

The ratchets $a$ $a'$ of the adjacent disks are respectively engaged by pawls $c$ $c'$, which are connected together so as to move as one and are pivoted by a rod $c^2$ on the T-head of a lever C, which is, as shown, attached to the armature $d$ of electromagnets D, said armature $d$ being pivoted at $d'$, so as to swing toward the magnets when the latter are energized, and is retracted or swung away therefrom by a spring $d^2$, as shown. The swinging of the armature of course vibrates lever C and pawls $c$ $c'$, and for each vibration of the lever C disk A is rotated one-tenth, and at every tenth rotative step given disk A disk A' is rotated one step.

Pawl $c$, resting on ratchet $a'$, prevents pawl $c'$ dropping down into engagement with ratchet $a'$ except after the ninth rotative step of disk A, at which point ratchet $a$ is notched, as at $a^4$, and pawl $c$ drops into this notch lower than usual, thereby lowering pawl $c'$ into position to engage ratchet $a'$ at the next pushing motion of the pawls. Thus in a very simple and effective manner the "carry over" is effected from one disk to the next. While but two indicating-disks are shown, obviously such a carry-over arrangement of pawls and ratchets could be applied to a greater number of disks, and it is shown as used in connection with three disks in the registering devices. Backward motion of the disks is of course prevented by the pawls, and momentum rotative movements thereof are prevented by pins $A^2$ on their sides, which engage with stops $C^2$, attached to the upper part of lever C and projecting into position to engage the pins when the lever swings toward the disks and moving out of the way as the lever swings away from the disks, and before the stops move back into position to engage the pins the pawls, if in operative position, will ratchet the disks forward one step. Springs $C^4$ may be arranged to normally press or swing the pawls toward the ratchets.

The magnets D are connected in electrical circuit with a battery or other suitable source of electricity (indicated at X) and one or more push-buttons or circuit-closing devices, (indicated at $x$,) and every time the circuit is closed the magnets D are energized and the indicating-disks properly actuated.

On shaft B is a disk $B^4$, which has a locking-notch $B^5$, engaged by a tooth $E^2$ on the end of an arm $E'$, attached to a rock-shaft E, journaled in the frame parallel with shaft B and at one side of the indicating-disks. The notch and tooth prevent shaft B being turned in one direction; but it can be turned in the opposite direction, forcing tooth $E^2$ out of notch $B^5$, and thereby depressing arm $E'$ and rocking shaft E. On shaft E is a stop-arm $e$, which projects up between the disks A A', and when shaft E is rocked, as described, it comes into the path of setting-pins $A^3$ on disks A A', so as to stop the backward rotation of the disks by shaft B when the numerals "0" appear at the sight-opening. Shaft E is also provided with a cam-finger $e'$, which engages lever C and throws the latter backward, so as to move stops $C^2$ out of the way simultaneously with the inward movement of stop-arm $e$, so that the frictional connection between the disks and the shaft will suffice to cause the disks to rotate with the shaft until arrested by stop-arm $e$, as described. When the shaft B has made a complete revolution, rock-shaft E is thrown back by a spring, so as to cause tooth $E^2$ to engage notch $B^5$ and draw stop $e$ out of the path of pins $A^2$ and cam $e'$ away from lever C. Shaft E also carries an arm $e^3$, whose free end is bent into position to engage with pins $f$ on a trip indicator-roller F, having its shaft $F'$ journaled in the frame parallel with the shafts B E, the roller being visible through a suitable sight-opening in the casing. Said roller has upon its periphery trip-indicating signs (as "Up," "Down") arranged alternately around it, so that each time shaft E is rocked this roller is moved one step and changes the trip indication. A spring $f^2$ is adapted to engage the pins $f$ and has its engaging end slightly bent, as at $f^3$, to project between adjacent pins sufficiently to prevent casual rotation of roller F.

Beside the indicating mechanism is a registering mechanism, consisting of a series of disks $G G' G^2$, rotatably mounted on a shaft H, parallel with shaft A and suitably spaced on said shaft by collars $H'$ thereon. These disks have numerals "0" to "9," inclusive, on their peripheries, and each has a ten-notched ratchet-disk ($g g' g^2$, respectively) attached to it. These ratchet-disks are adapted to be engaged by pawls ($i i' i^2$, respectively) attached to a bar $I'$, pivotally mounted on a rod $I^2$, supported in the free end of a vibrating lever I, the other end of which is pivoted at $I^3$, so that the pawls can be swung toward and from the disks. Lever I is in line with lever C and is connected therewith and actuated thereby by means of a connecting-rod J, which may be provided with suitable adjusting-nuts $J'$ on its ends, if desired, and each time lever C is actuated lever I is also actuated, and every fare indicated is simultaneously registered. The pawls $i i' i^2$ are pressed toward their ratchets by a spring $i^4$; but they are so fixed relatively that pawl $i'$ cannot engage its ratchet-disk $g'$ until pawl $i$ drops into a notch $g^3$ in ratchet $g$, which notch follows the ninth tooth, and thus at the tenth or last step of ratchet $g$ pawl $i'$ will move ratchet $g'$ one notch. Pawl $i^2$ will be held out of engagement with its ratchet $g^2$, however, until pawl $i'$ drops into a similar notch in ratchet $g'$ simultaneously with pawl $i$ dropping into notch $g^3$. Thus while disk G is caused to rotate one step every time disk A is shifted a step disk $G'$ is only moved one step at every tenth step of disk G and disk $G^2$ is only moved one step at every tenth step of disk $G'$. Spring-stops $K K' K^2$ are arranged to bear on ratchets $g g' g^2$, so as to prevent casual rotation of disks $G G' G^2$ in either direction.

I have thus far described but one set of registering and indicating devices; but any number of additional sets desired may be arranged in like manner in the same casing. As shown, a duplicate set of indicating and registering disks are employed in the machine, constructed and arranged and operated like those already described, and in the drawings the parts of this duplicate set of indicating and registering mechanisms are lettered similarly to those already described, so that detailed description thereof is unnecessary. Both sets of indicating-disks are mounted on shaft B, and both sets of registering-disks are mounted on shaft H.

In the drawings I have shown four magnets D in connection with the second or left-hand set of indicating and registering mechanisms. The right-hand set of indicating and registering mechanisms may be used for cash fares and the left-hand set of such mechanisms used for ticket fares. Of course each set of mechanisms is controlled by independent electrical circuits and independent electrical circuit-closers, as indicated in the drawings, so that the conductor will push a "cash-button" when registering cash fares and a "ticket" push-button when registering ticket fares.

The construction and operation of the mechanisms will be readily comprehended from the foregoing description and drawings, and

What I claim as new, and desire to secure by Letters Patent thereon, is—

1. The combination of a rotatable shaft, independently rotatable, indicator-disks rotatably mounted in axial alinement thereon, but frictionally connected therewith, a swinging lever, a set of connected pawls carried by said lever for actuating the disks, a rock-shaft beside the disks, devices on said shaft for throwing the pawls out of operative position, devices on said shaft for stopping the disks at "0" position when the disk-supporting shaft is turned backward, and a lever on the rock-shaft engaging a notched disk on said supporting-shaft, substantially as described.

2. In combination, a rotatable shaft, axially-alined numbered disks rotatably mounted on said shaft; ratchets on said disks, a cam-disk fixed on said shaft, a swinging lever beside the disks, and pawls pivoted to said lever and engaging said ratchets; with a rock-shaft beside the disks, a stop on said shaft for arresting the resetting movement of the disks, and an arm on said rock-shaft engaging the said cam-disk, substantially as described.

3. In combination, a rotatable shaft, a notched cam-disk fixed thereon, axially-alined indicating-disks rotatably mounted on said shaft and frictionally connected therewith, ratchets on said indicating-disks, a swinging lever beside the disks, a set of connected pawls pivoted to said lever and respectively engaging said ratchets, a rock-shaft beside the disks, an arm on said rock-shaft engaging said notched disk; a stop on said shaft for arresting the resetting movements of the disks, and a cam-arm on said shaft adapted to engage the lever and move the pawls away from the disks, during resetting thereof, substantially as described.

4. In combination, a rotatable shaft, a notched disk fixed thereon, axially-alined indicating-disks frictionally mounted on said shaft, a vibrating lever beside said disks, a set of rigidly-connected pawls carried by said lever engaging ratchets on the disks, and stops on said lever for preventing momentum movements of the disks; with a rock-shaft beside the disks, an arm on said shaft engaging said notched disk, a stop on said shaft for arresting the resetting movement of the disks, a trip-indicating mechanism actuated by said rock-shaft, and a total-registering mechanism actuated from said lever, all substantially as and for the purpose described.

In testimony that I claim the foregoing as my own I affix my signature in presence of two witnesses.

JAMES H. JOHNSON.

In presence of—
ALEXANDER C. SCHUMAN,
GEO. E. SCHUMAN.